US010872483B2

(12) United States Patent
Schoenfelder et al.

(10) Patent No.: US 10,872,483 B2
(45) Date of Patent: Dec. 22, 2020

(54) SYSTEMS AND METHODS FOR CONTROLLING ACCESS TO PHYSICAL SPACE

(71) Applicant: Latchable, Inc., Sterling, VA (US)

(72) Inventors: Luke Andrew Schoenfelder, Willow Street, PA (US); Michael Brian Jones, Pittsburgh, PA (US); Thomas Meyerhoffer, Montara, CA (US); Ali Akbar Hussain, Plymouth, MN (US); Ivan Almaral Sole, New York, NY (US); Travis Holt, Brooklyn, NY (US); James Griszbacher, Brooklyn, NY (US)

(73) Assignee: LATCHABLE, INC., Sterling, VA (US)

( * ) Notice: Subject to any disclaimer, the term of this patent is extended or adjusted under 35 U.S.C. 154(b) by 0 days.

(21) Appl. No.: 16/136,935

(22) Filed: Sep. 20, 2018

(65) Prior Publication Data
US 2019/0035194 A1    Jan. 31, 2019

Related U.S. Application Data

(62) Division of application No. 15/342,911, filed on Nov. 3, 2016, now Pat. No. 10,083,559.
(Continued)

(51) Int. Cl.
*G06K 19/00* (2006.01)
*G07C 9/00* (2020.01)
(Continued)

(52) U.S. Cl.
CPC ......... *G07C 9/00722* (2013.01); *G06F 21/31* (2013.01); *G06F 21/34* (2013.01);
(Continued)

(58) Field of Classification Search
USPC ........ 235/375, 382, 435, 439, 451, 487, 492
See application file for complete search history.

(56) References Cited

U.S. PATENT DOCUMENTS 6,971,029 B1 * 11/2005 Avery, IV ............... G06F 21/32
340/5.5
8,358,197 B2    1/2013 Tran
(Continued)

FOREIGN PATENT DOCUMENTS

CN    101136112 A    3/2008
CN    202939691 U    5/2013
(Continued)

OTHER PUBLICATIONS

Extended European Search Report dated Jun. 28, 2019 received in related European Patent Application No. 16862970.7 (10 pages).
(Continued)

*Primary Examiner* — Matthew Mikels

(57) ABSTRACT

Disclosed systems and methods relate to a smart access control reader for an access control system. According to embodiments, a method can include installing the smart access control reader to the access control system by connecting the smart access control reader to the access control system via wiring of the access control system. The method can also include receiving, by the smart access control reader, one or more first credentials for authenticating one or more users by the access control system. The method can further include determining, by the smart access control reader, that the one or more first credentials are authorized. Moreover, the method can include transmitting, by the smart access control reader, a second credential to an access control panel of the access control system, in response to a request by a first user to access an area monitored by the access control system.

23 Claims, 13 Drawing Sheets

Related U.S. Application Data

(60) Provisional application No. 62/250,849, filed on Nov. 4, 2015.

(51) Int. Cl.
  *G06F 21/31* (2013.01)
  *G06F 21/34* (2013.01)
  *G06K 7/08* (2006.01)
  *G06F 21/32* (2013.01)
  *G07C 9/25* (2020.01)

(52) U.S. Cl.
  CPC ......... *G06K 7/087* (2013.01); *G07C 9/00571* (2013.01); *G07C 9/00857* (2013.01); *G06F 21/32* (2013.01); *G07C 9/0069* (2013.01); *G07C 9/00309* (2013.01); *G07C 9/00563* (2013.01); *G07C 9/257* (2020.01)

(56) References Cited

U.S. PATENT DOCUMENTS

| | | |
|---|---|---|
| 9,437,063 B2 | 9/2016 | Schoenfelder et al. |
| 9,666,000 B1 | 5/2017 | Schoenfelder et al. |
| 10,083,559 B2 | 9/2018 | Schoenfelder et al. |
| 2002/0147924 A1* | 10/2002 | Flyntz .................... G06F 21/32 726/4 |
| 2002/0184497 A1 | 12/2002 | Gage et al. |
| 2003/0200446 A1 | 10/2003 | Siegel et al. |
| 2004/0041019 A1 | 3/2004 | Schneider et al. |
| 2007/0146118 A1 | 6/2007 | Rodriguez et al. |
| 2013/0120109 A1 | 5/2013 | Libin et al. |
| 2014/0062656 A1 | 3/2014 | Bowen et al. |

FOREIGN PATENT DOCUMENTS

| | | | |
|---|---|---|---|
| EP | 3062294 A1 | 8/2016 | |
| WO | WO-96/30857 A1 | 10/1996 | |
| WO | WO-2015/130809 A1 | 9/2015 | |
| WO | WO-2015130809 A1 * | 9/2015 | ........... G06K 9/0002 |

OTHER PUBLICATIONS

Office Action dated Mar. 26, 2020 received in related Chinese Patent Application No. 201680064693.8 (28 pages).

* cited by examiner

SYSTEMS AND METHODS FOR CONTROLLING ACCESS TO PHYSICAL SPACE

CROSS-REFERENCE TO RELATED APPLICATIONS

This is application is divisional application of U.S. application Ser. No. 15/342,911, entitled "SYSTEMS AND METHODS FOR CONTROLLING ACCESS TO PHYSICAL SPACE," which was filed on Nov. 3, 2016 and which claims the benefit under 35 U.S.C. § 119(e) to U.S. Provisional Application No. 62/250,849, entitled "Systems And Methods for Controlling Access to Physical Space," which was filed on Nov. 4, 2015, the entire contents of which are incorporated herein by reference.

This application is also related to U.S. application Ser. No. 14/589,805, entitled "Methods and Systems for Multi-Unit Real Estate Management," filed on Jan. 5, 2015, and to U.S. application Ser. No. 15/257,750, entitled "Methods and Systems for Access Control and Awareness Management," filed on Sep. 6, 2016, the entire contents of both applications are incorporated herein by reference.

FIELD OF THE DISCLOSURE

The present disclosure relates to systems and methods for controlling access to physical space, and more specifically to systems and methods for providing a smart access control reader to an existing access control system.

BACKGROUND

A traditional access control system is architected around a reader, an access control panel, and an electronic door activating hardware device. The readers receive credentials from users and transmit the received credentials to the access control panel. The access control panel stores a preset list of authorized credentials and checks the information passed from the reader against the preset list of authorized credentials to determine whether that user is authorized to perform its desired action, e.g., be allowed access to a particular area. If it is determined that the user is authorized to perform its desired action, the access control panel can unlock the electronic door activating hardware.

Traditional access control systems lack support for the rapid management of users and the provisioning of access to guests because all of the authorized credentials must be synced with the access control panel. This process of synching the credentials can involve numerous steps of human involvement on the part of building management and the access or security management company. In addition, the process can involve modifying multiple pieces of software for the actual updating of the access control panel, and can also involve updating the different ways of communicating and updating access information for owners, users, and guests. Moreover, an upgrade to the reader can require substantial changes to the underlying system.

SUMMARY

Systems and methods for an access control system are provided. According to embodiments, a method for using a smart access control reader in an access control system can include installing the smart access control reader to the access control system, by connecting the smart access control reader to the access control system via wiring of the access control system. The method can also include receiving, by the smart access control reader, one or more first credentials for authenticating one or more users by the access control system. The method can also include determining, by the smart access control reader, that the one or more first credentials are authorized. The method can also include transmitting, by the smart access control reader, a second credential to an access control panel of the access control system, in response to a request by a first user to access an area monitored by the access control system.

According to embodiments, the one or more first credentials can include the second credential.

According to embodiments, the second credential can be different from the one or more first credentials.

According to embodiments, the method can further include transmitting, by the access control panel, instructions to an electronic locking mechanism to activate a relay to provide access to the first user, in response to receiving the second credential.

According to embodiments, the one or more first credentials can be received using at least one of a magnetic stripe reader system, a proximity reader system, an radio-frequency identification (RFID) system, an access code system, and a biometric verification system.

According to embodiments, the determining, by the smart access control reader, that the one or more first credentials are authorized can include comparing the one or more first credentials against a list of authorized credentials stored in a database. The determining, by the smart access control reader, that the one or more first credentials are authorized can also include validating, at the smart access control reader, the one or more first credentials based on the comparison.

According to embodiments, the database can be stored in a memory of the smart access control reader.

According to embodiments, the database can be coupled to the smart access control reader.

According to embodiments, the smart access control reader can include at least one of a camera, a touchpad, a light-emitting diode (LED) indicator, an imaging sensor, an audio sensor, a wireless controller, a touch controller, a display controller, a network controller, an external interface bus configured to connect to an external authentication device, a second interface configured to communicate with a user device to regulate access based on a payment, and a power management integrated circuit (PMIC), wherein the PMIC performs power management for one or more components of the smart access control reader.

According to embodiments, the method can further include powering down one or more components of the smart access control reader.

According to embodiments, the method can further include detecting a tampering event associated with the smart access control reader. The method can also include generating an alert.

According to embodiments, the method can further include protecting data stored in the smart access control reader by at least one of deleting the data and encrypting the data, in response to the detecting of the tampering event.

According to embodiments, the method can further include capturing at least one of an image, a video recording, and an audio recording, in response to the detecting of the tampering event.

According to embodiments, a smart access control reader for an access control system can include an interface configured to receive one or more first credentials. The smart access control reader can also include a processor configured to determine whether the one or more first credentials are authorized. The processor can also be configured to transmit a second credential to an access control panel of the access control system when the one or more first credentials are authorized, in response to a request by a first user to access an area monitored by the access control system. The smart access control reader can also include a storage module configured to store the second credential.

According to embodiments, the one or more first credentials can be received using at least one of a magnetic stripe reader system, a proximity reader system, an radio-frequency identification (RFID) system, an access code system, and a biometric verification system.

According to embodiments, the processor can be configured to determine whether the one or more first credentials are authorized by comparing the one or more first credentials against a list of authorized credentials stored in a database and validating the one or more first credentials based on the comparison.

According to embodiments, the database can be stored in a memory of the smart access control reader.

According to embodiments, the database can be coupled to the smart access control reader.

According to embodiments, the smart access control reader can further include at least one of a camera, a touchpad, a light-emitting diode (LED) indicator, an imaging sensor, an audio sensor, a wireless controller, a touch controller, a display controller, a network controller, an external interface bus configured to connect to an external authentication device, a second interface configured to communicate with a user device to regulate access based on a payment, and a power management integrated circuit (PMIC), wherein the PMIC performs power management for one or more components of the smart access control reader.

According to embodiments, the processor can be further configured to detect a tampering event associated with the smart access control reader. The process can also be configured to generate an alert.

According to embodiments, the processor can be further configured to protect data stored in the smart access control reader by at least one of deleting and encrypting the data, in response to the detecting of the tampering event.

According to embodiments, the processor can be further configured to capture at least one of an image, a video recording, and an audio recording, in response to the detecting of the tampering event.

These and other embodiments will be described in greater detail in the remainder of the specification referring to the drawings.

BRIEF DESCRIPTION OF THE DRAWINGS

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

DETAILED DESCRIPTION

Figure 1:
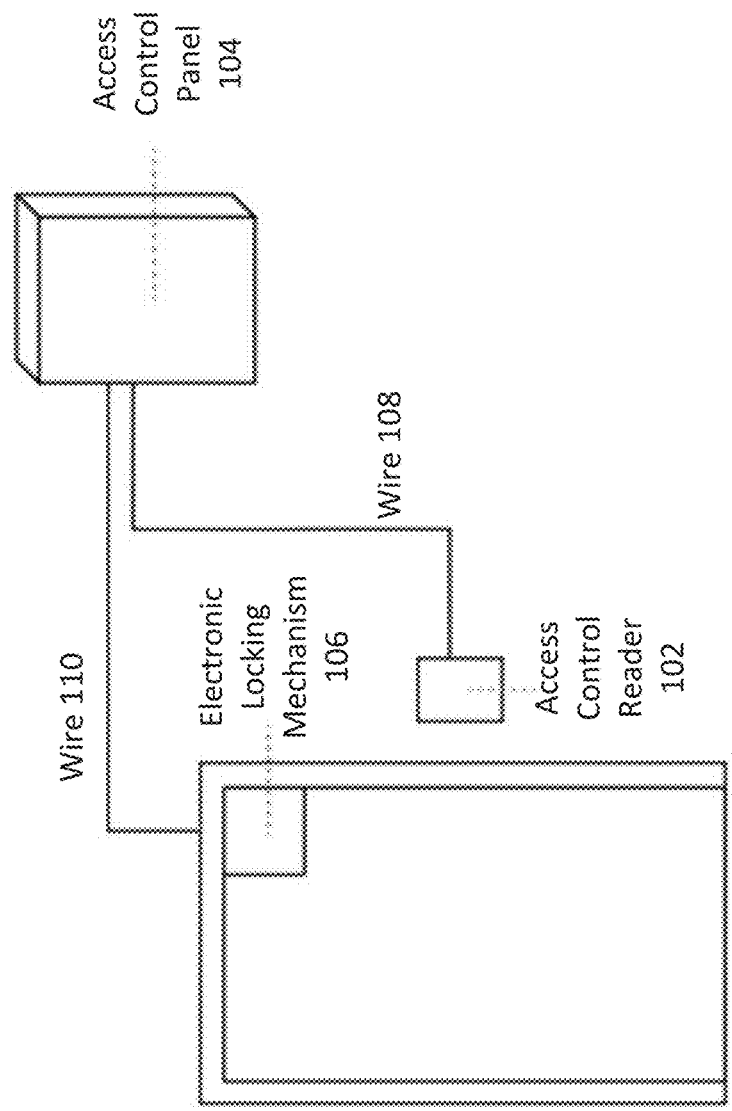
FIG. 1 illustrates an access control system.

Systems and methods relate to one or more devices that can be used in an access control system. According to embodiments, a system can include a smart access control reader (hereinafter referred to as the "smart reader"), which is a hardware device that can provide access to physical space. The disclosed smart reader can replace existing access control readers, for example, prior art access control readers, in an existing access control system. The disclosed system can also include a suite of software that can control the smart reader. The software can be installed and/or executed on one or more of the following devices: the smart reader, a user device that is used to communicate with the smart reader, and any other devices that are used to manage the access control system. For example, these devices can include user devices of residents and guests of a building that has implemented an access control system utilizing the smart reader, to provide controlled access to residents of the building and their guests. The smart reader can include secure wireless communication components that can be used in conjunction with user authentication mechanisms, e.g., mechanisms involving access cards, passwords, visual identifiers, biometric identifiers, and smartphones to provide access control. Such authentication mechanisms can be implemented as a part of the smart reader and/or as a part of a user device. They can also be implemented as a separate, standalone device(s) that is connected to the smart reader. The smart reader can be paired with any number of different trim pieces, including locks, doors, electric access control systems, storage containers, vehicles, and any other device needing to be secured.

The smart reader can be valuable within many industries, including the commercial office and multi-unit building industry, because it can replace an existing access control reader, e.g., an access control reader using a conventional proximity or magnetic stripe card system, without the need to rewire the underlying building infrastructure. As replacing equipment or adding new equipment is a costly part of maintaining or installing an access control system, means of upgrading existing equipment with minimal installation time and effort can be substantially valuable, and the smart reader can provide these means.

Unlike traditional security hardware products that were built to accomplish specific goals in specific instances, the disclosed smart reader can regulate access to any other device, to which the smart reader can be attached or connected. In some embodiments, the smart reader can be physically attached or connected to another device. For example, the smart reader can attach or connect to another device using a wire. As another example, the smart reader can attach or connect to another device wirelessly.

The smart reader has many advantages over traditional reader products as the smart reader can enable simplified engineering and simplified manufacturing. The disclosed smart reader can use similar device firmware across multiple products, can provide a uniform user experience across multiple contexts and environments, can manage an entire network of access points in a similar way, can allow the development of a unified set of software applications running on electronic devices that can interact with any access point, can provision a single credential to operate in multiple contexts, can create a single secure identity that can be utilized at multiple access points, can layer various multi-factor or 3-factor authentication mechanisms into each access point where the smart reader is installed, can more easily replace faulty components in the field, can provide inventory flexibility when considering the manufacturing, fulfillment, and installation of components in the field and can provide numerous other logistical advantages known to those familiar with the industry and its challenges. In addition, the smart reader can make retrofitting into existing buildings easy and can enable nearly instantaneous access and user management. The smart reader can also provide new levels of visibility into available access and history.

According to embodiments of the present disclosure, the smart reader can detect a building's preexisting credentialing system and adapt the building's preexisting communications to mimic the operations of the access control reader it is replacing. By mimicking the former access control reader's communications, the smart reader can gain control over the entire access control system at the building. Using internal components, such as a microprocessor, internal storage, and wireless communications equipment, the smart reader can process, store, and manage credentials for users at the building without having to use the previous system.

In addition, the smart reader can be installed in new building environments and utilize more advanced wired communications, e.g., power over Ethernet, or wireless communications to perform the same functions without the need to utilize a separate access control panel and credential management system.

FIG. 1 illustrates an access control system 100. The access control system 100 can include an access control reader 102, an access control panel 104, and an electronic locking mechanism 106. The access control reader 102 can be connected to the access control panel 104, by any appropriate coupling means, e.g., by a wire 108. The electronic locking mechanism 106 can be connected to the access control panel 104 by any appropriate coupling means, e.g., by a wire 110.

The access control reader 102 can receive and process credentials, e.g., signals that can identify different individuals. The access control reader 102 can use one or more of different mechanisms, including a magnetic stripe reader system, a proximate reader system, a radio-frequency identification (RFID) system, a key code entry system, and a biometric system, e.g., biometrics involving a fingerprint, retina, and palm, to receive the credentials. Depending on the mechanism, the required user input to gain access to a secure space can be different. For example, a magnetic card reader can require a user to swipe a card that includes a magnetic stripe on the card. As another example, a proximity card reader can require a user to place a proximity card close to the access control reader. Yet in another example, a key code entry system can require a user to enter in an access code. After the access control reader 102 receives the user input, the access control reader 102 can then process the received user input, e.g., a user credential, by determining the corresponding identity. The access control reader 102 can determine the corresponding identity, for example, by examining the user credential to check whether it is valid. In some embodiments, if the user credential is valid, the access control reader 102 can send a signal to the access control panel 104, where the signal is known to the access control panel 104 to unlock the electronic locking mechanism 106. In some embodiments, the access control reader 102 can translate the received credentials, for example, into a predetermined alpha-numeric format, which can then be transmitted to the access control panel 104 using the wire 108.

The access control panel 104 can store a preset list of authorized credentials and process received signals based on this preset list. The access control panel 104 can receive the translated credential from the access control reader 102. The access control panel 104 can then check this translated credential against the preset list to determine whether the user is authorized to perform the desired action at the desired time. For example, the user may be attempting to access a secure area at 10 PM on Wednesday using the user's card but the user may be allowed to access the secure area only between 9 AM and 5 PM on weekdays. In this example, the access control panel 104 can deny the user access because the access control panel 104 has determined that the user is trying to access the secure area outside the allowed time. However, had the user been attempting to access the secure area during the allowed time, e.g., at 3 PM on Wednesday, the access control panel 104 could have allowed the user to access the secure area.

The access control panel 104 can allow access to the user by transmitting signals to the electronic locking mechanism 106 using the wire 110 such that the electronic locking mechanism 106 can unlock the locking mechanism. The user can access the secure space when the locking mechanism has been unlocked. For example, the electronic locking mechanism 106 can unlock a lock for a door, a locker, or any other locked secure space. The electronic locking mechanism 106 can lock the secure space again after one or more of the following conditions have been satisfied: the user has entered the secure area, the user has entered the secure area and left the secure area, a pre-defined period of time has passed since the lock was unlocked, or any other conditions that the access control system administrator has defined. In some cases, only one of the conditions can be required; in other cases, more than one conditions can be required.

Figure 2:
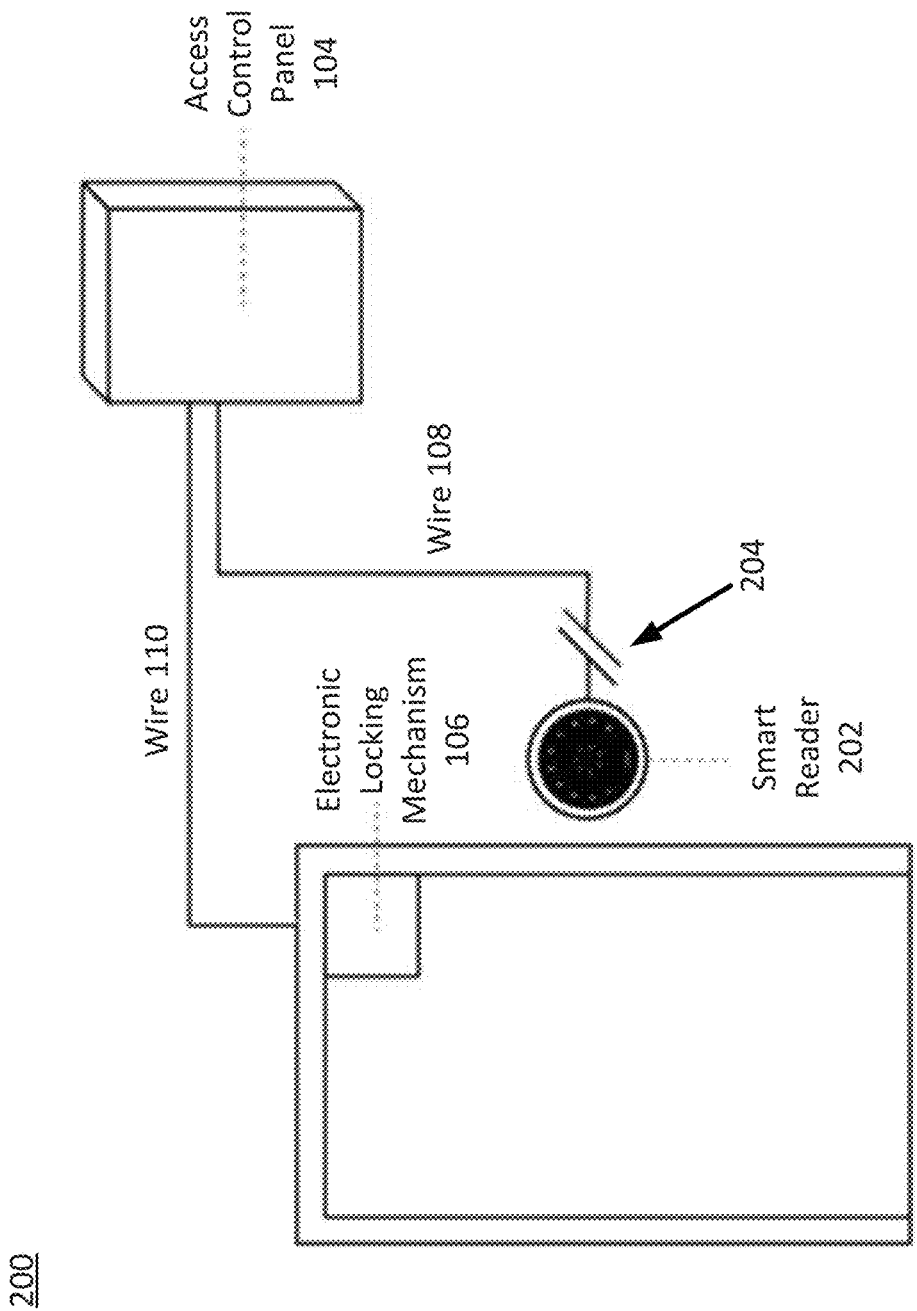
FIG. 2 illustrates an access control system in accordance with embodiments of the present disclosure.

FIG. 2 illustrates an access control system 200 in accordance with embodiments of the present disclosure. The access control system 200 can include all the same subsystems, e.g., the access control panel 104, the electronic locking mechanism 106, the wire 108, and the wire 110, as the access control system 100 in FIG. 1, in addition to the smart reader 202 that has replaced the former access control reader 102. In some embodiments, the access control system 200 can provide the same functionalities as the access control system 100, although the reader in the system has changed. In these embodiments, users of the access control system 200 may not notice any difference between the former access control system 100 and the current access control system 200. In other embodiments, the smart reader 202 can add more functions and features compared to the former access control system 100. In some embodiments, the smart reader 202 can modify one or more functions and features of the former access control system 100.

According to some embodiments of the present disclosure, the former access control reader 102 can be removed by disconnecting it from the wire 108 at a location 204. The smart reader 202 can be wired to the same wire 108 at or near the location 204. The smart reader 202 can be paired with any number of different trim pieces, including locks, doors, electronic access control systems, storage containers, vehicles, computer systems, and any other device needing to be secured. A method of installing and setting up the smart reader 202 is further described in reference to FIG. 12 below.

Figure 3:
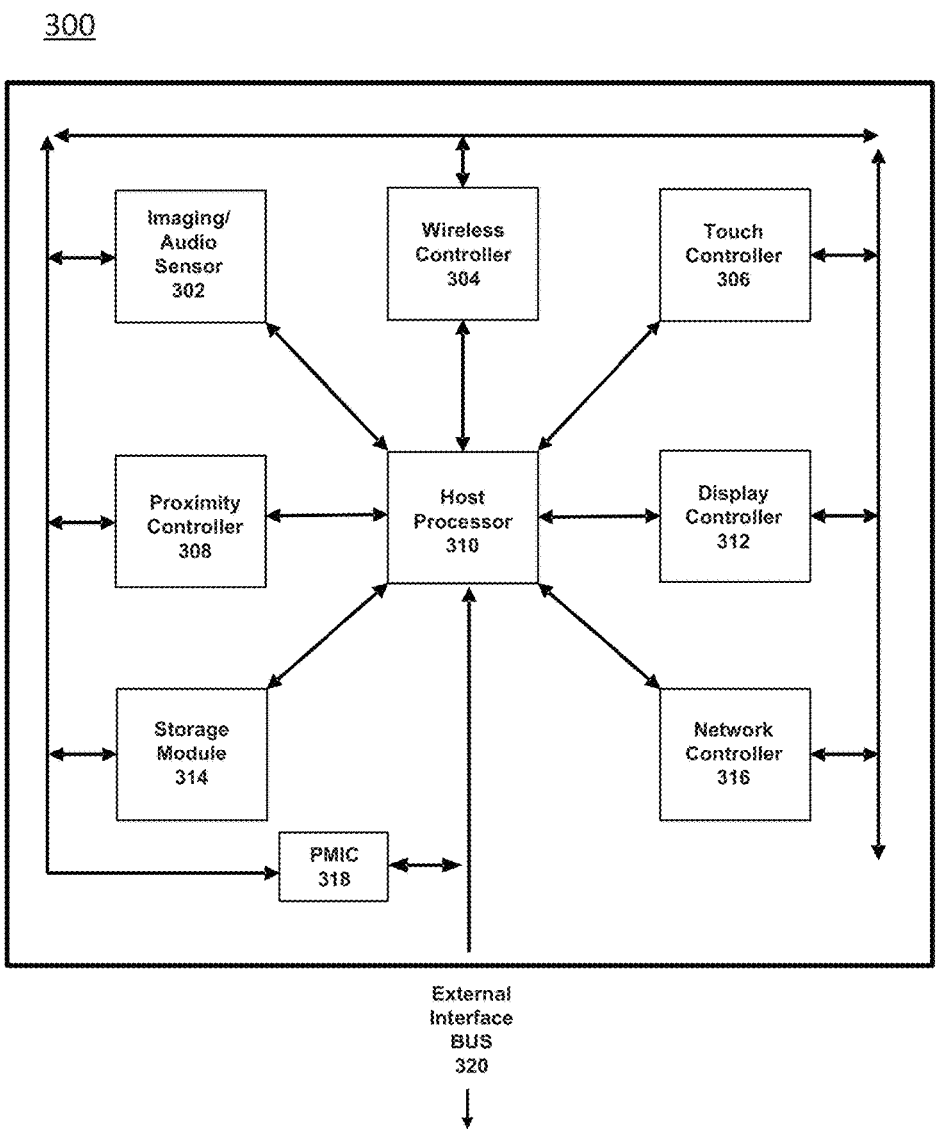
FIG. 3 illustrates a system diagram of a smart reader in accordance with embodiments of the present disclosure.

FIG. 3 illustrates a system diagram 300 of the smart reader in accordance with embodiments of the present disclosure. In some embodiments, the smart reader 202 in FIG. 2 can be represented by the system diagram 300. In some embodiments, the smart reader 202 can include one or more components, for example, imaging/audio sensor 302, wireless controller 304, touch controller 306, proximity controller 308, host processor 310, display controller 312, storage module 314, network controller 316, power management integrated circuit (PMIC) 318, and external interface bus 320. Various components that are part of the smart reader 202 can be implemented as hardware, software, or combinations of both. These various components can be arranged in different ways. While these various components are shown as separate, distinct components in the system diagram 300, one or more of these components can be combined and/or separated into more components. For example, the touch controller 306 and the display controller 312 can be combined to form an integrated component. As another example, the imaging/audio sensor 302 can be separated into two separate components—for example, as an imaging sensor and an audio sensor. In some embodiments, the smart reader 202 can also include other components.

The imaging/audio sensor 302 can detect and/or capture images, videos, and audio. The imaging/audio sensor 302 can be an optical, mechanical, or other type. The detected and/or captured images, videos, and/or audio can be used for various purposes.

According to some embodiments of the present disclosure, the detected/captured image, video, and/or audio can be used for authentication purposes. In some embodiments, the access control system can use biometric verification as a mechanism to authenticate a user, where the user's biometric image (e.g., the face, facial feature, retina, fingerprint), the user's biometric video (e.g., a video that includes a series of user's biometric images), and/or the user's biometric audio (e.g., the user's voice) are compared against data in the access control system.

According to some embodiments of the present disclosure, the imaging/audio sensor 302 can be used for tamper prevention purposes. In some embodiments, the imaging/audio sensor 302 can detect when the smart reader 202 is moved. This can prevent circumvention or tampering of the security protocols running on the smart reader. For example, the imaging/audio sensor 302 can detect when the smart reader 202 is moved in an unexpected way. In some embodiments, the imaging/audio sensor 302 can enable the smart reader 202 to determine whether it is being tampered with, in which case the smart reader 202 can perform different types of security and tamper prevention measures. These measures can include, for example, sending an alert to a manager of the access control system or nearby users, broadcasting an audible, visible, or other types of alerts to those nearby, deleting or encrypting sensitive data from the device itself, e.g., deleting valid credentials such as those used for accessing the access control panel and those belonging to users of the smart reader, restoring the smart reader to factory settings, capturing image, video, and/or audio and storing that data in internal memory, and other functions which can increase the security of the access control system.

Figure 5:
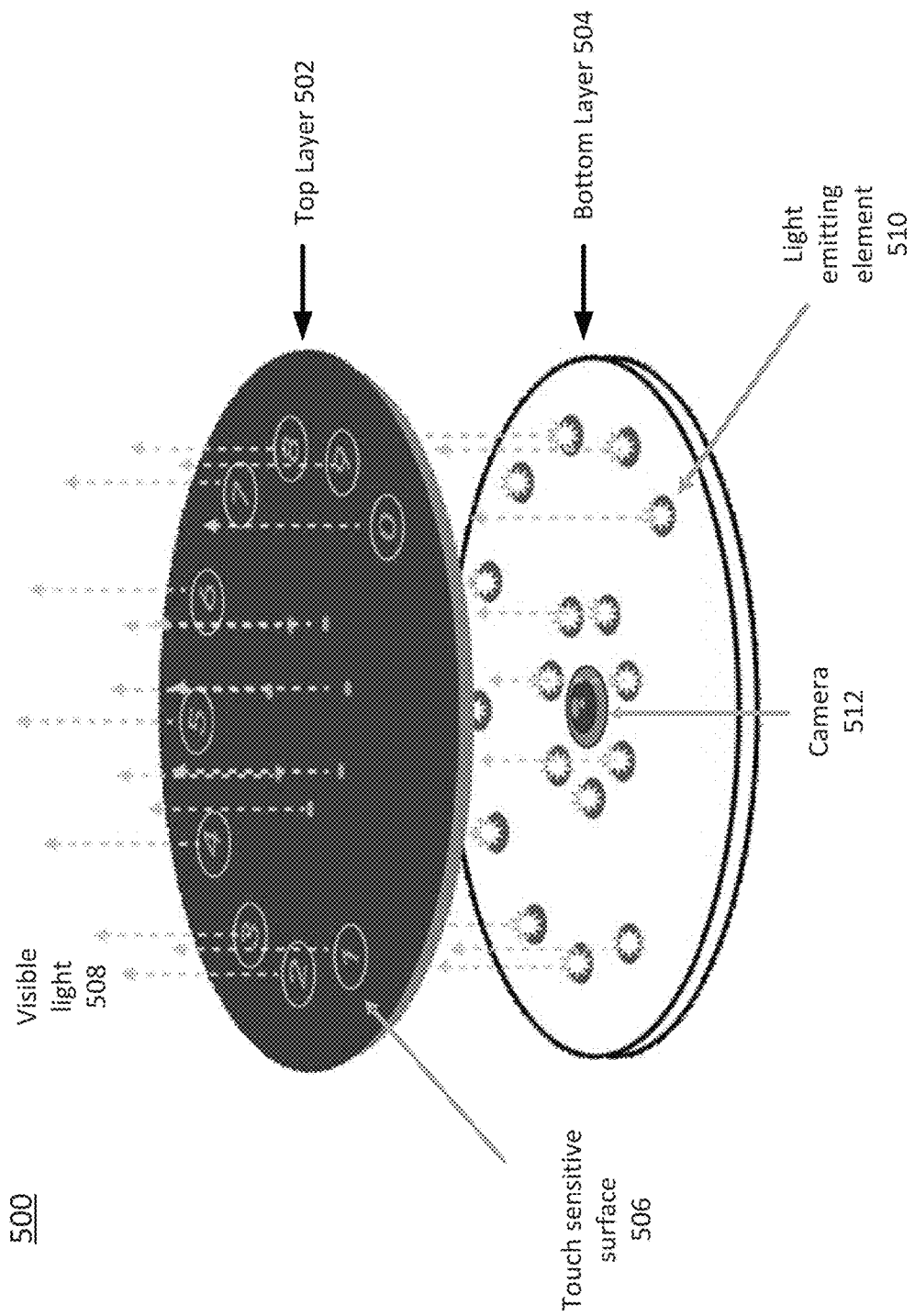
FIG. 5 illustrates a smart reader in accordance with embodiments of the present disclosure.

According to some embodiments of the present disclosure, the imaging/audio sensor 302 can include a camera, e.g., camera 512 in FIG. 5, or can be connected to a camera. The imaging/audio sensor 302 can activate its camera in connection with tampering events to attempt to capture evidence of who is responsible for the tampering. This data can be stored locally or transmitted via a wired or wireless connection to relay this information to people or entities, such as security or management personnel, for post-incident analysis or real-time alerts and visibility. In some embodiments, the tamper prevention functionality can be made visible and/or public so that the access control system can become more secure by discouraging tampering or other negative behaviors in environments, where the smart reader is installed. In other embodiments, the tamper prevention functionality can be hidden.

The wireless controller 304 can control a wireless connection with another device. In some embodiments, this wireless connection is made within the access control system. For example, the wireless controller 304 can be used to connect and communicate with a component, e.g., the access control panel 104 in FIG. 2, of the access control system. In some embodiments, this wireless connection is made with a device outside the access control system. For example, the wireless controller 304 can be used to connect and communicate with an external or remote database for authentication purposes. As another example, the wireless controller 304 can be used to connect and communicate with a user device, e.g., a user's smartphone, a user's computer. User devices can be connected to perform various operations, including performing authentication and alerting security personnel. In some embodiments, the wireless controller 304 can make either a secure or non-secure connection. The wireless standards or protocols supported by the wireless controller 304 can include, for example, Bluetooth, ZigBee, Near Field Communication (NFC), and other standards and/or protocols.

The touch controller 306 can provide means of entering access codes. For example, the access control system may require its user to enter an access code in the form of a series of numbers. The smart reader can provide a way for the user to enter the access code, e.g., using the touchpad with numbers shown in FIG. 4. The touch controller 306 can receive the user input and transmit it to the host processor 310 for further processing.

The proximity controller 308 can support functions associated with a proximity authentication mechanism. For example, the access control system may require a user to place a proximity card close to a proximity card reader, which can be a part of the smart reader or can be a separate device. When the proximity card is placed close to the proximity card reader, the proximity controller 308 can receive authentication information from the proximity card and transmit it to the host processor 310 for further processing.

The display controller 312 can provide means of signaling output to a user. For example, the smart reader can include or can be connected to a display, e.g., light-emitting diode (LED) screen or a light crystal display (LCD) screen. This display can provide information, e.g., instructions, general information, a directory, and maps, to its users. The host processor 310 can retrieve data representing such information from the storage module 314 and transmit the data to the display controller 312 for outputting to the display.

The storage module 314 can store various types of data for the access control system. These data types can include, for example, authentication data associated with accessing the underlying access control system via the access control panel, e.g., the access control panel 104 in FIG. 2, authentication data associated with users of the access control system, and data required for operations of any other components of the smart reader, e.g., information outputted to the display via the display controller 312, and captured images, videos, and audio by the imaging/audio sensor 302.

Some or all of the data stored in the storage module 314 can be sensitive. Thus, it can be desirable to protect some or all of the data in the storage module 314. In some embodiments, the smart reader can provide means of detecting when the smart reader is moved or tampered with. For example, the smart reader can include a tamper detection switch, which can in turn include a mechanical pin. The mechanical pin can be compressed and released with its relative position being provided as an input to the smart reader to switch into modes of higher security. As another example, this same functionality can be activated through the use of an optical sensor that detects changes in light or other visual indicators to detect and relay events back to the smart reader. Yet in another example, this same functionality can be activated by detecting a loss of power to the smart reader and triggering a backup power source to delete or secure data as necessary. In some embodiments, the sensors used in detecting tampering can be calibrated to eliminate false positives or missed events for them to work in a wide variety of environments and mounting scenarios. In some embodiments, when tampering or movement of the smart reader is detected, the smart reader can perform data securing operations. For example, some or all of the data in the storage module 314 can be deleted, encrypted, or moved to a secure element within or outside the smart reader. This securing of sensitive data can prevent unauthorized data theft or data visibility and can be essential to the overall performance of the access code reader.

The network controller 316 can provide means of communicating via a network connection. In some embodiments, the network controller 316 can be used in connecting and communicating with other devices within or outside the access control system. For example, the network controller 316 can be used for communicating with the access control panel 104.

The power management integrated circuit ("PMIC") 318 can be used to manage power for the smart reader 202. A power source for the smart reader 202 can include one or more of different types, including a battery and a wired power connection. For example, the smart reader 202 can be powered solely by a wired power connection. As another example, the smart reader 202 can be powered primarily by a wired power connection but can also include a back-up battery. In some embodiments, the smart reader 202 can leverage an existing power source of the existing access control system.

The smart reader 202 can run in a power-efficient manner. This can be advantageous, especially for situations where the smart reader 202 operates in various types of power-constrained environments. For example, the smart reader 202 can run on battery power. As another example, the smart reader 202 can be located in a building that is monitoring energy consumption for financial or ecological reasons.

According to some embodiments of the present disclosure, the PMIC 318 can provide mechanisms for the smart reader 202 to run in a power-efficient manner. In some embodiments, the smart reader 202 can operate in different states, such as in a rest state and an active state. For example, when the smart reader 202 is used, it can be in an active state. As another example, when the smart reader 202 is not used or has not been used for a period of time, it can be in a rest state. In some embodiments, one or more components of the smart reader 202 can power down when the smart reader 202 is in the rest state. For example, if the smart reader 202 is not used for a prolonged period of time, the display controller 312 and/or the storage module 314 can be powered down.

In some embodiments, even when the smart reader 202 is in the rest state, it can be desirable to have the smart reader 202 ready to quickly power up necessary components when required by a user. For example, the smart reader 202 may need to be able to process proximity-based or touch-based inputs in order to respond and perform the required functions in a timely fashion. In this case, components, such as the touch controller 306 or the proximity controller 308 can be kept on, while some other components are powered down. The PMIC 318 can control the flow of power to one or more components of the smart reader 202. In some embodiments, such power management can be performed at the hardware-level and/or the software-level. Other power management mechanisms are described with reference to FIG. 5 below.

The host processor 310 can process instructions related to data and operations for various components in the smart reader 202. For example, when the touch controller 306 receives a user's access code via a touchpad, the touch controller 306 can instruct the host processor 310 to determine whether the access code is valid. In this example, the host processor 310 can receive the access code from the touch controller 306 and compare the access code against a set of valid access codes stored in a database, which can reside in the storage module 314. The host processor 310 can also compare the access code against a set of valid access codes stored in an external or remote database by retrieving data from the external or remote database using the network controller 316.

The external interface bus 320 can be used to connect the various hardware components within the smart reader 202 with one or more of external authentication devices so that the smart reader 202 can be used in conjunction with various authentication mechanisms such as those involving magnetic stripes, proximity credentials, RFID, access codes (including passwords), visually-based identifiers, audio-based identifiers, biometric identifiers, and smartphones. For example, the smart reader 202 can be connected to an external biometric scanner, e.g., a biometric scanner that can recognize a user's retina patterns, a user's fingerprint, and/or a user's facial features, that can provide the user's biometric information to the smart reader 202 via the external interface bus 320. As another example, the smart reader 202 can be connected to an external microphone that can use biometrics to detect a user's voice. In some embodiments, one or more external authentication devices, including those described above, can be integrated with the smart reader 202.

According to some embodiments of the present disclosure, the smart reader 202 can function as a flexible terminal to accept a variety of security related inputs that may become standards in the future. For example, a new communication protocol or security mechanism may be introduced to electronic devices in the future, and the smart reader 202 can continue to operate with the electronic device of the future by sharing some common communication capability with the electronic device of the future. The flexible terminal can allow the smart reader to function for a longer period of time than traditional access control readers. The flexible terminal can also allow for the incorporation of new features into the smart reader indirectly, as the secondary devices that communicate with the smart reader can add new features, and the smart reader can receive those features by proxy.

According to some embodiments of the present disclosure, the smart reader 202 can also provide assistance to users with impairment by providing a variety of input methods. For example, many electronic devices have accessibility modes that allow users to communicate via haptic controls with feedback, via voice guidance, or other enhanced means. The smart reader 202 can allow these types of accessibility features on a user's own electronic device to be linked with the capabilities of the smart reader 202 or on a secondary device that is connected to the smart reader 202. This can allow the smart reader 202 to provide those accessibility features by proxy. In addition, the smart reader can communicate with a wide variety of proximity based authentication devices such that users who are incapable of operating more advanced credentialing methods can use wearable devices to authenticate with the smart reader 202. Thus, users with impairments or disabilities can easily use the smart reader 202.

According to some embodiments of the present disclosure, the smart reader 202 can regulate access based on payments. For example, the smart reader 202 can communicate with a user device, e.g., a proximity-based payment card, an electronic device such as a smartphone, to receive and transmit payments as necessary. In some embodiments, the smart reader 202 can directly communicate with a user device. In other embodiments, the smart reader 202 can indirectly communicate with a user device via a secondary device. One example case, where this payment technology can be utilized, can involve users reserving and/or purchasing space on demand using a payment method or an electronic device containing a payment protocol. This can be useful in the context of shared space arrangement, e.g., shared hospitality or office spaces, shared lockers, and any other shareable spaces, where a user can rent the space by communicating with the smart reader 202 to govern access.

According to embodiments of the present disclosure, the smart reader 202 can be sequenced or paired with one another to create redundant or complimentary layers of authentication across an environment. This combination of the application control readers can take place within the same device, or across multiple locations in an access control system, e.g., a building or other environment where multiple points require this type of solution.

According to embodiments of the present disclosure, the smart reader 202 can be used in conjunction with other electronic devices to provide logical access control and/or digital login capabilities for various devices. This can enable a single smart reader to provide both logical and physical access control and extend the same multi-faceted authentication capabilities to devices, which currently do not have them.

According to embodiments of the present disclosure, the smart reader 202 can be used with a physical key entry system. For example, the smart reader 202 can be connected to a separate physical key entry system, or can implement a physical key entry system within the smart reader 202 or within a mounting plate, e.g., physical key entry system 1004. In some cases, the administrator of the access control system may want to keep the key to the system as a backup. In some cases, certain users, e.g., users who do not have a mobile device or users who feel more comfortable with the physical key entry system, can request a key and use the physical key entry system. In some embodiments, the physical key entry system being used with the smart reader 202 can have a sensor that can detect an object in the keyhole. In some embodiments, using information from the sensor, the smart reader 202 can determine whether an entry is valid, e.g., someone using a valid key vs. someone trying to make an unauthorized entry. If the entry is not valid, the smart reader 202 can determine that there is a tampering event and take appropriate measures, which can include those that are described herein in reference to other types of tampering events. In some embodiments, every entry using the physical key entry system and/or every entry attempt using the physical key entry system can be logged. In other embodiments, only unauthorized entries can be logged. Any logs related to the physical key entry system can be stored internal and/or external to the smart reader 202.

According to embodiments of the present disclosure, the smart reader 202 can include wiring that allows it to be added to an existing access control or intercom system that has basic wiring. This can allow an easy upgrade to an existing access control or intercom system. Many traditional access control or intercom systems have simple relays and wiring configurations that are old. Being able to interact with these traditional access control or intercom systems requires a breadth of pre-programmed credential and protocol emulation and the ability to download further libraries as they become available. The smart reader 202 can hold libraries of credential standards and communication protocols to ensure compatibility across a wide variety of contexts. These pre-programmed and downloaded libraries can aid installers by shortening the installation process and can make the access control or intercom system operational for users at the building.

According to embodiments of the present disclosure, the smart reader 202 can incorporate image, video, and/or audio data with an existing intercom system and/or a user device, e.g., a mobile device such as a smartphone. For example, the smart reader 202 that has been installed to an intercom system can capture an image, video, and/or audio and transmit the captured image, video, and/or audio to an existing intercom screen and/or to a user device. Conversely, the existing intercom system can transmit an image, video, and/or audio to the smart reader 202 and/or to a user device.

Various functions and capabilities of the smart reader 202 have been described. In some embodiments, all of these functions and capabilities can be performed by a single smart reader. In other embodiments, the smart reader can perform a subset of these functions and capabilities, while other devices connected to the smart reader 202 can perform one or more of these functions and capabilities.

Figure 4:
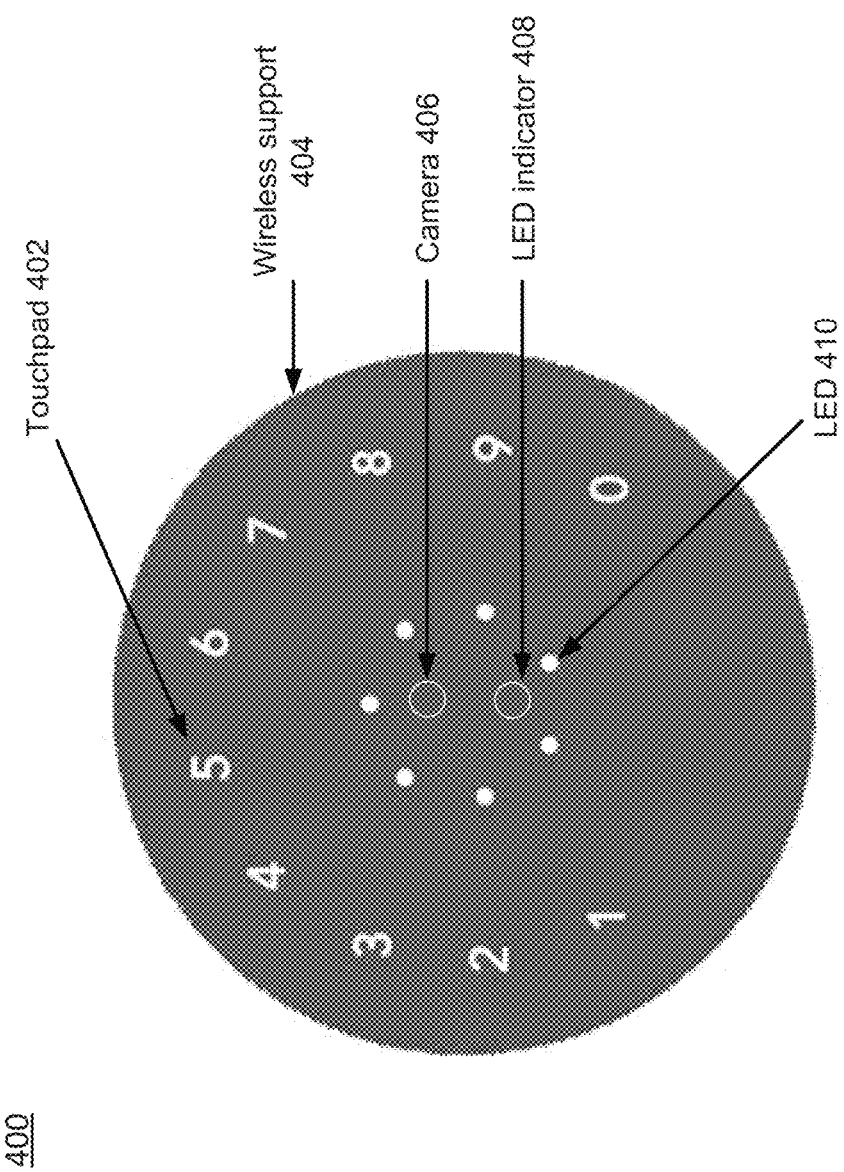
FIG. 4 illustrates a smart reader in accordance with embodiments of the present disclosure.

FIG. 4 illustrates user interface 400 of a smart reader 202 in accordance with embodiments of the present disclosure. The user interface 400 can include various features, for example, a touchpad 402, wireless support 404, a camera 406, an LED indicator 408, and an LED 410. The touchpad 402 can be used for a user to enter an access code. In some embodiments, only a portion of the top surface of the user interface 400 can be touch-sensitive. For example, only the numbers and areas near these numbers can be touch-sensitive. The wireless support 404 can provide a user device to connect to the smart reader. The wireless support 404 can also allow a secondary electronic device to connect and provide authentication mechanisms, e.g., biometric authentication mechanism. Standards and protocols, such as Bluetooth and NFC, can be used to communicate between the smart reader and a user device. The camera 406 can capture images, videos, and/or audio. In some embodiments, the camera 406 can be a wide-angle camera. The LED indicator 408 can provide information about the smart reader 202. For example, the LED indicator 408 can indicate different states, for example, no issue, error, low power, no power, standby, and any other state related to various conditions. The LED 410 can also be used to light the smart reader 202. For example, the LED 410 can be used to display input means, as the LED 410 can illuminate the touchpad 402 from behind. In some embodiments, the LED 410 can be turned on only when a user is accessing the smart reader and/or when the smart reader is operating in dark. In some embodiments, the smart reader 202 can include protective coating, e.g., scratch resistant, oleophobic.

FIG. 5 illustrates a smart reader 500, for example, the smart reader 202 of FIG. 2, in accordance with embodiments of the present disclosure. In some embodiments, the smart reader 500 can include two separate layers: a top layer 502 and a bottom layer 504. In some embodiments, the top layer 502 can be a stenciled and/or reinforced surface. The top layer 502 can include a touch sensitive surface 506. For example, in FIG. 5, the circles enclosing each of the ten digits (0 to 9) can be touch sensitive. A user of the smart reader 500 can enter an access code using these touch sensitive areas. For example, if an access code assigned to a user is "1234," the user can tap the numbers corresponding to the access code to gain access to a secure space, for which the smart reader 500 is implemented. In some embodiments, the touch sensitive surface 506 can emit visible light 508, such that the user can see the numbers in dark. One or more light emitting elements 510 can be a source of the visible light 508.

In some embodiments, the smart reader 500 can limit power consumption by utilizing an LED(s) as the light emitting elements 510. By placing the LED(s) behind the touch sensitive surface 506, the smart reader 500 can provide the appearance of a touchscreen that can reduce power consumption compared to a full touchscreen. In some embodiments, the touch sensitive surface 506 can be shielded from exterior light sources. In some embodiments, the touch sensitive surface 506 can be selectively illuminated by the LED(s) to give the illusion of being a touch surface with illuminated characters. In some embodiments, the illusion can be further enhanced to feel like a touchscreen by varying the brightness and/or speed with which the LED(s) light up and power down to mimic those of more advanced displays.

According to some embodiments of the present disclosure, the smart reader 500 can capture images, videos, and audio as necessary in association with access events taking place at the device. For example, each time a user enters a credential, that activity can be captured by the onboard recording equipment to create a secure activity log. This capability can also be applied to guests. The smart reader 500 can use a camera 512 to capture an image or a video. The smart reader 202 can use a recorder to capture audio. In some cases, it can be advantageous to conceal the fact that such monitoring capabilities exist. Thus, in some embodiments, the camera 512 and/or recorder can be hidden behind another feature of the smart reader 500 such that the camera 512 and/or recorder can be concealed. By concealing, the camera 512 and/or recorder can also be shielded and protected. In some embodiments, the smart reader 500 can use a surface finish and/or light shielding to conceal the presence of the camera 512.

Figure 6:
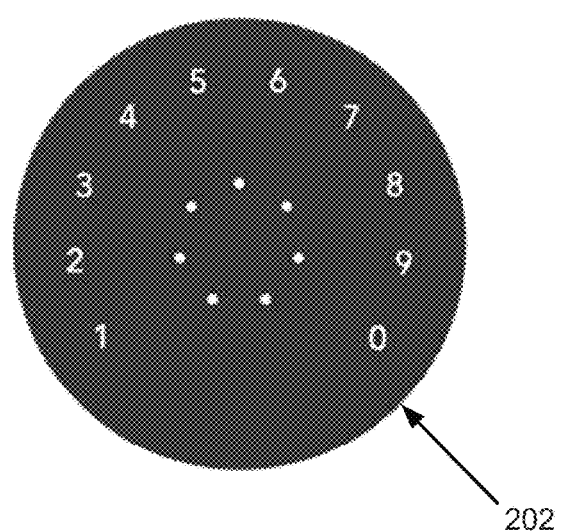
FIG. 6 illustrates a smart reader as a standalone device in accordance with embodiments of the present disclosure.

FIG. 6 illustrates the smart reader 202 (in FIG. 2) as a standalone device in accordance with embodiments of the present disclosure.

The physical properties of the smart reader 202 can be important as they impact the overall security of the device itself. In some embodiments, the smart reader can blend into its surroundings, survive extreme conditions indoors and outdoors, protect sensitive electronics, and/or perform a variety of functions specific to a security product. One of the security risks of the smart reader 202 can be that the access code input element may retain smudges from a user entering access codes that could then be viewed by another party to predict what the authorized user's access code is or increase the probability of guessing the correct access code. To protect from this security risk, the surface of the smart reader can be incased or treated with a special coating, e.g., oleophobic in nature, that obscures the presence of fingerprints. The smart reader 202 can also be protected from scratching and surface wearing. The smart reader 202 can be conditioned to increase the longevity of the product, which can help in environments where the smart reader 202 is used by a variety of guests and primary users.

In some embodiments, the position of input values, e.g., numbers, on the smart reader 202 can change to prevent someone observing an access code entry from knowing what the actual access code is. This feature can thwart someone who might be recording the user's motions in order to correlate motion with hitting certain input values, e.g., numbers. In some embodiments, the input values on the smart reader 202 can be dynamically changed so that they do not read sequentially, e.g., instead of the numbers arranged from 1 to 10, the numbers can be arranged as 1, 7, 6, 3, 2, 5, 0, 8, 9, 4. The arrangement of input values can change based on various conditions. For example, the input value arrangement can change before and/or after a user has used the smart reader 202. As another example, the input value arrangement can change after a period of time. In some embodiments, the input values can be dynamically arranged using different types of surfaces, including, for example, a touchscreen.

The smart reader 202 can have one or more of mounting plates and/or covers to allow the smart reader 202 to function in various contexts and/or mounting configurations. These contexts and mounting configuration can include: outdoor, indoor, different types of walls (e.g., concrete wall, brick wall, glass wall, metal wall, wooden wall), different types of doors (e.g., wood door, metal door, plastic door, glass door), exposure to extreme elements, and protection from environmental challenges. The mounting plates and/or covers can expand the number of environments in which the smart reader 202 can function by protecting the sensitive internal components, expanding the places where the smart reader can be installed, and addressing other problems, e.g., having doorframes that are thinner than the reader that require an adapter plate to function, faced by traditional systems.

Figure 7:
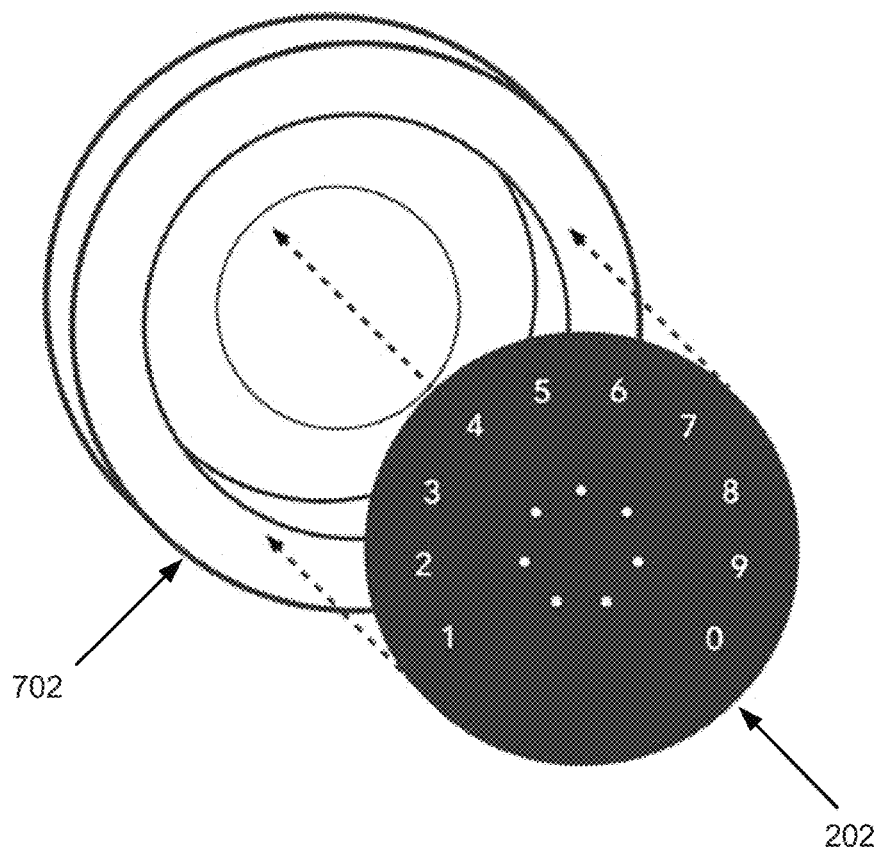
FIG. 7 illustrates placing a smart reader into a mounting plate in accordance with embodiments of the present disclosure.

FIG. 7 illustrates how the smart reader 202 can be placed into a mounting plate 702 in accordance with embodiments of the present disclosure. The mounting plate 702 can acts as support hardware for the smart reader 202.

Figure 8:
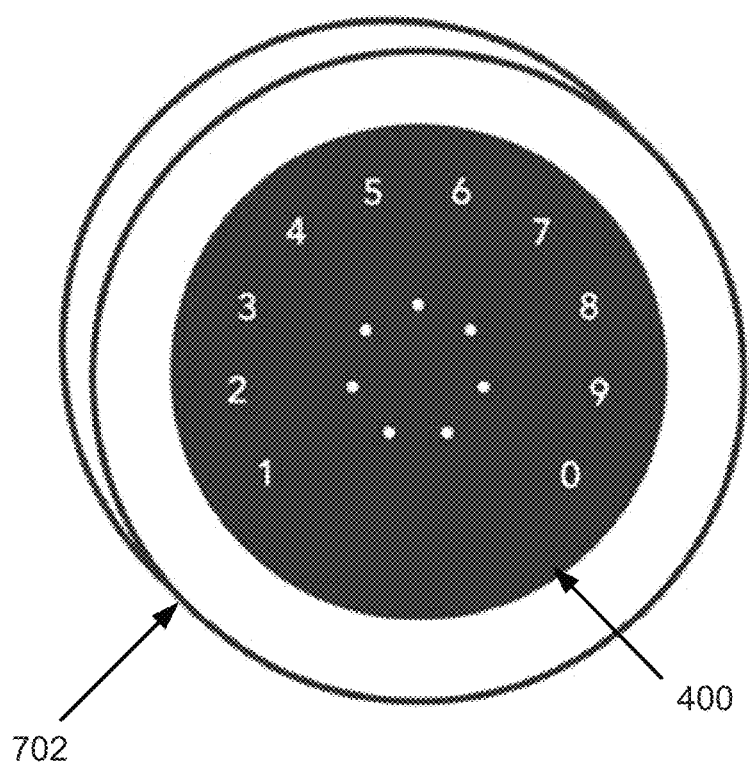
FIG. 8 illustrates an operating device after a smart reader has been placed into a mounting plate in accordance with embodiments of the present disclosure.

FIG. 8 illustrates an operating device after the smart reader 202 has been placed into the mounting plate 702 from FIG. 7 in accordance with embodiments of the present disclosure.

Figure 9:
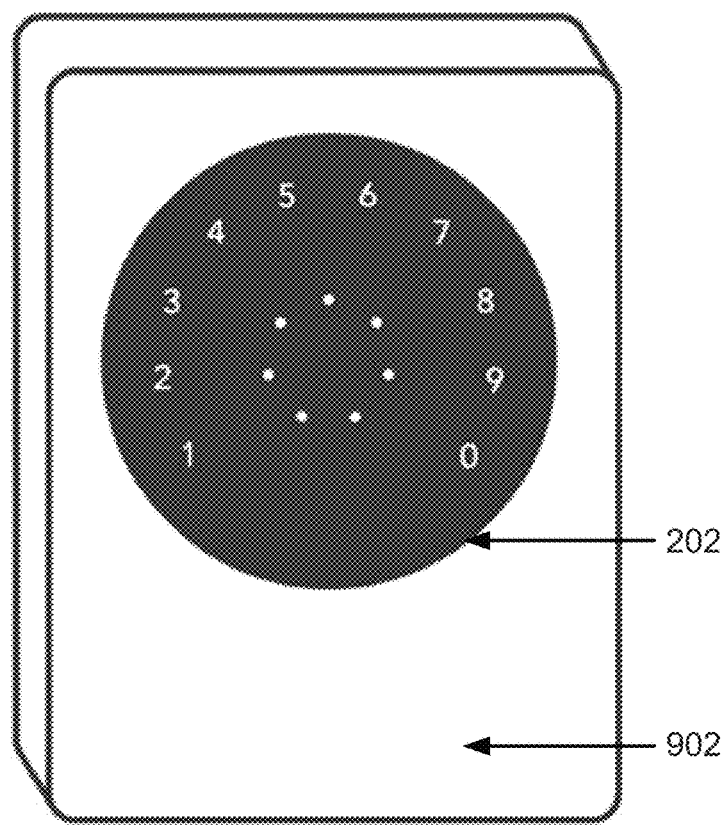
FIG. 9 illustrates a smart reader in a mounting plate to operate in an electronic access form in accordance with embodiments of the present disclosure.

FIG. 9 illustrates the smart reader 202 in a mounting plate 902 to operate in an electronic access form in accordance with embodiments of the present disclosure.

Figure 10:
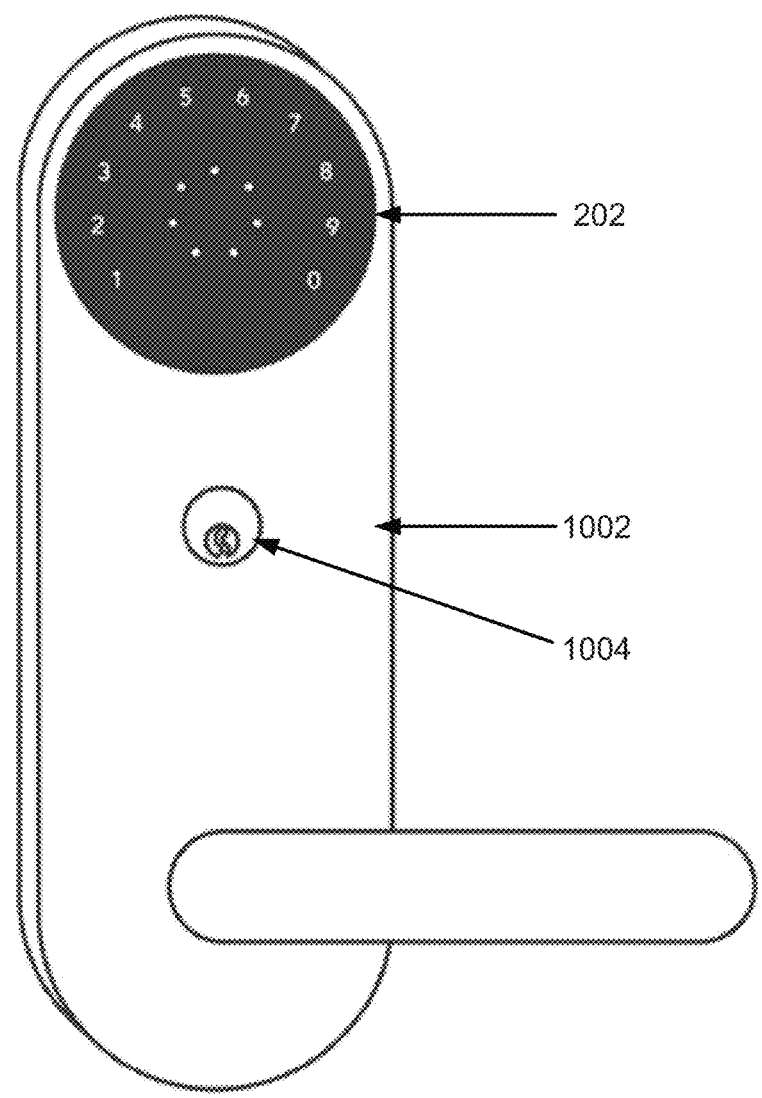
FIG. 10 illustrates a smart reader in a mounting plate to operate in a lock form in accordance with embodiments of the present disclosure.

FIG. 10 illustrates the smart reader 202 in a mounting plate 1002 to operate in a lock form in accordance with embodiments of the present disclosure. In some embodiments, the mounting plate 1002 can have a physical key entry system 1004.

Figure 11:
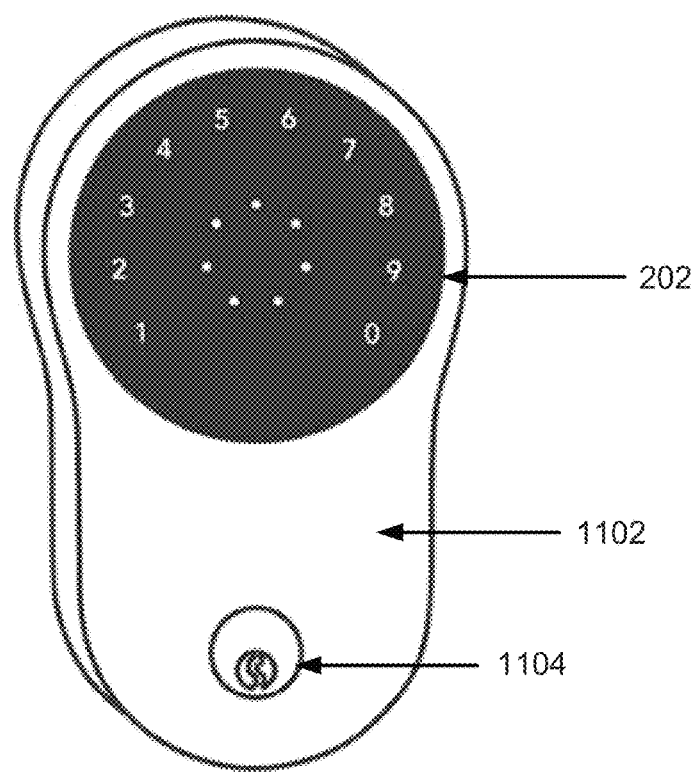
FIG. 11 illustrates a smart reader in a mounting plate to operate in a lock form in accordance with embodiments of the present disclosure.

FIG. 11 illustrates the smart reader 202 in a mounting plate 1102 to operate in a lock form in accordance with embodiments of the present disclosure. In some embodiments, the mounting plate 1102 can have a physical key entry system 1104.

Figure 12:
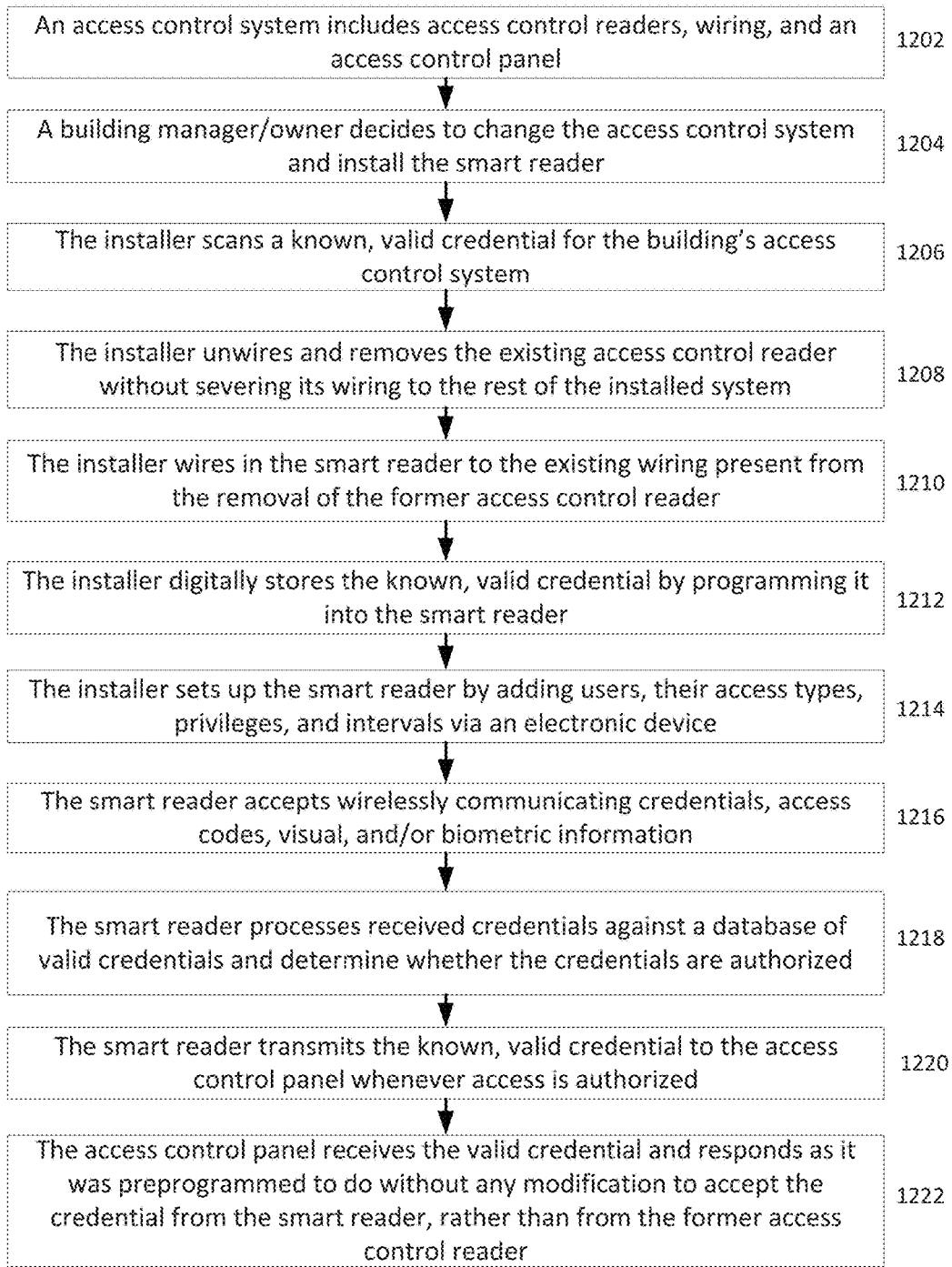
FIG. 12 illustrates a use case for installation and setup of a smart reader in accordance with embodiments of the present disclosure.

FIG. 12 illustrates an exemplary method for installation and setup of the smart reader in accordance with embodiments of the present disclosure. An existing access control system can include one or more access control readers, wiring, and an access control panel (1202). This existing access control system can be similar to the access control system 100 in FIG. 1. A building manager or owner decides to change the access control system by installing the disclosed smart reader (1204). The building manager or owner may want this change to upgrade or fix the existing access control reader in the access control system. This smart reader can be, for example, the smart reader 202 in FIG. 2.

When an installer arrives at the installation site, the installer scans one of the authorized credentials from building management (1206). For example, the installer can scan an existing RFID card that works on the existing access control system to receive an internal number for the purposes of emulating it with the smart reader. The scanned authorized credential has already been programmed or can be programmed into the existing access control panel.

The installer can store the authorized credential, for example, in a mobile device carried by the installer, until it becomes necessary later in the setup process. After shutting down power to the existing access control reader or taking required safety precautions, the installer can remove the existing access control reader, e.g., from the wall, and can disconnect it from the junction box, exposed wiring, or other configuration found on site (1208). At this point, the installer will be left with an exposed set of wiring used to connect the former access control reader.

Using the exposed wiring, the installer can wire in the smart reader and mount it to the wall (1210). After restoring power, the smart reader is ready to be programmed. The previously scanned credential is programmed into the smart reader, e.g., by transmitting the credential to the smart reader from the installer's mobile device (1212). The installer can add new authorized users to the memory of the smart reader and a remote server, if any, via a mobile device (1214). The smart reader can process physical access credentials, passwords and/or access codes, and can communicate directly with other electronic devices and biometric identifiers (1216).

Once all of the authorized users and their modes of credentialing are created and stored, users can approach the smart reader to authenticate. When the smart reader is provided a credential, it validates the credential on the smart reader without having to validate the credential via the previously installed access control reader (1218). Once a credential is validated by the smart reader, the smart reader securely utilizes the credential that was stored during setup by sending that credential down the wire to the preexisting access control panel (1220). The access control panel does not know the difference between the means by which the credential is provided by the smart reader and the means by which that credential was provided by the former access control reader. Because that credential is authorized, the access control panel will activate a relay for the appropriate electronic door activating hardware (1222).

All of the above operations can be performed without the need to reprogram the panel, rewire the building, or change any electronic door activating hardware. According to embodiments, the new smart reader can handle the credentials and user management separately from the preexisting system. In some embodiments, the smart reader can achieve this by communicating with a network via an onboard wireless communication system, such as WiFi or a GSM network connection. It can also communicate via a nearby electronics device and can do so passively when a user interacts with the smart reader. For example, if a user connects via Bluetooth on the user's smartphone with the smart reader to authenticate, the smartphone can also pass authorized user list updates to the smart reader during its individual access transaction, providing a means of seamlessly updating the smart reader's credentialing system without the need for a dedicated network connection at the building.

According to embodiments of the present disclosure, one or more operations in FIG. 12 can be performed for an existing intercom system, instead for an existing access control system. In the case of an existing intercom system, when a user is authenticated via the smart reader, the user can communicate with a desired party via the existing intercom system. In some embodiments, the smart reader can be directly connected to the access control hardware, e.g., the door control hardware, without needing to be connected to an access control panel. In some embodiments, the smart reader can be installed and used in an access control system that includes an integrated intercom system.

Figure 13:
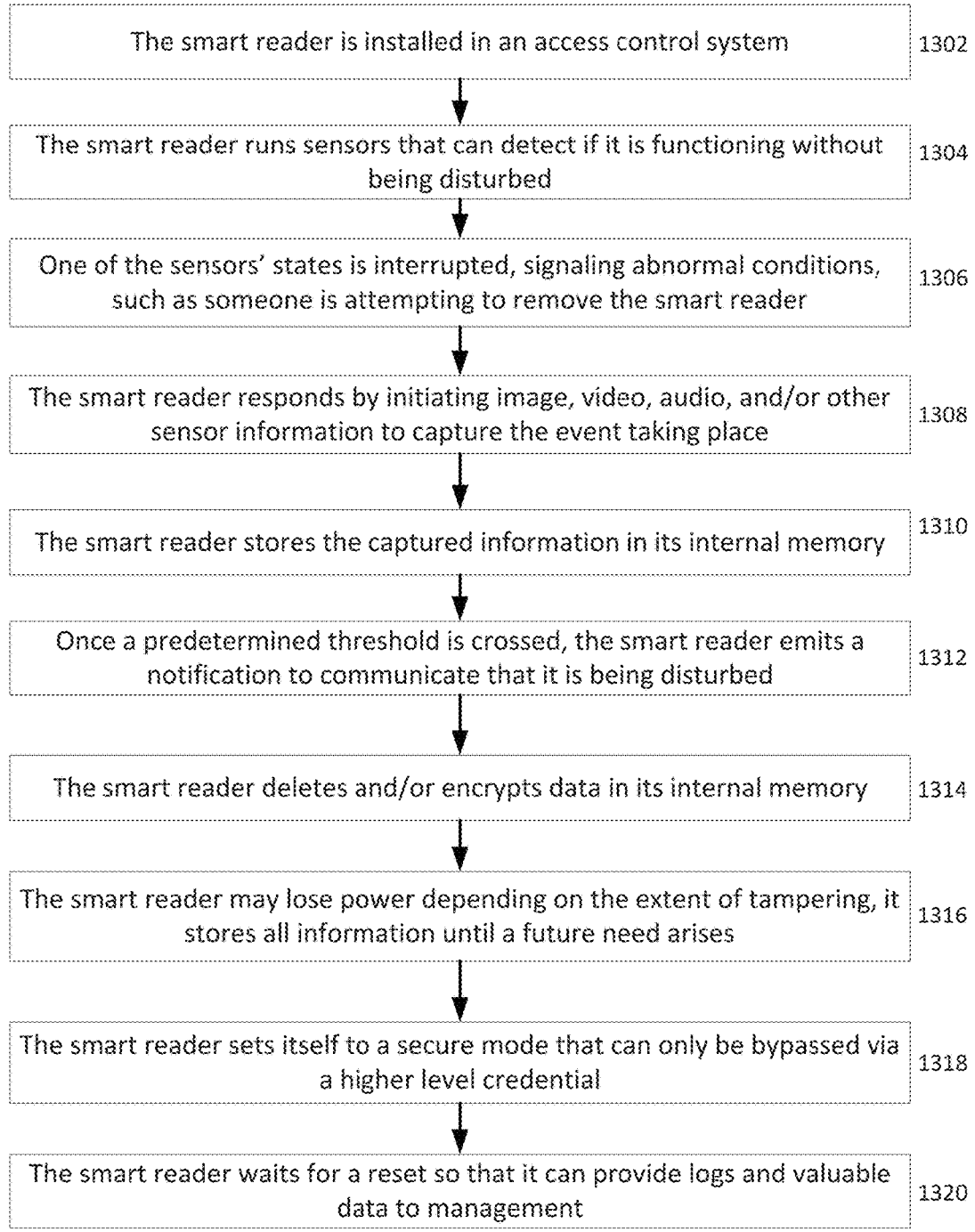
FIG. 13 illustrates a use case of security methods of a smart reader in accordance with embodiments of the present disclosure.

FIG. 13 illustrates a use case of security methods of the smart reader in accordance with embodiments of the present disclosure. The smart reader is installed in an existing access control system (1302). For example, the smart reader can be installed using the installation steps described in FIG. 12. The smart reader can run sensors that can detect when it is being disturbed, e.g., being removed, moved, or tampered with (1304). One of the sensors detects that there are abnormal conditions (for example, someone is attempting to remove the smart reader from its fixed position) (1306). When such an event is detected, the smart reader responds by capturing an image, video, audio, or other sensor information of the event taking place (1308). The smart reader can then store the captured information in its internal memory, e.g., the storage module 314 in FIG. 3 (1310). When a predetermined threshold is crossed, the smart reader emits a notification to communicate that it is being disturbed (1312). For example, if the sensor detects that the smart reader has been moved more than a threshold distance, e.g., 0.5 mm, from its initial position, the smart reader can set off a visible and/or audible alarm. Moreover, the smart reader deletes and/or encrypts some or all of the data in its internal memory (1314). For example, the smart reader can delete all the user names and their credentials, while encrypting all the other data. If the smart reader loses power because of the tampering event, the smart reader stores all information until a future need arises (1316). Such information can include internal logs, sensor readings, user data, images, videos, and audio. The smart reader also sets itself to a secure mode, which would require a higher level credential, e.g., an account with the root administrator's privileges, to reset (1318). The smart reader then waits for a reset, which can enable the management of the access control system to access logs and other valuable information in the smart reader (1320).

Various other modifications and additions can be made to the exemplary embodiments discussed without departing from the scope of the present disclosure. For example, while the embodiments described above refer to particular features or particular steps, the scope of this disclosure also includes embodiments having different combinations of features or steps, and embodiments that do not include all of the above described features or steps. Embodiments can also include other features or steps that are not described herein.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Furthermore, an implementation of the communication protocol can be realized in a centralized fashion in one system, or in a distributed fashion where different elements are spread across several interconnected systems. Any kind of computer system, or other apparatus adapted for carrying out the methods described herein, is suited to perform the functions described herein.

Connections between different devices can be made with or without a wire. For example, the connection between the access control panel and the smart reader can be wired and/or wireless. As another example, the connection between the access control panel and the electronic locking mechanism can be wired and/or wireless.

What is claimed is:

1. A smart access control reader for an access control system, the smart access control reader comprising:
   an interface configured to receive one or more first credentials;
   a processor configured to:
     determine whether the one or more first credentials are authorized; and
     transmit a second credential to an access control panel of the access control system when the one or more first credentials are authorized, in response to a request by a first user to access an area monitored by the access control system; and
   a storage module configured to store the second credential.

2. The smart access control reader of claim 1, wherein the one or more first credentials are received using at least one of a magnetic stripe reader system, a proximity reader system, an radio-frequency identification (RFID) system, an access code system, and a biometric verification system.

3. The smart access control reader of claim 1, wherein the processor is configured to determine whether the one or more first credentials are authorized by:
   comparing the one or more first credentials against a list of authorized credentials stored in a database; and
   validating the one or more first credentials based on the comparison.

4. The smart access control reader of claim 3, wherein the database is stored in a memory of the smart access control reader.

5. The smart access control reader of claim 3, wherein the database is coupled to the smart access control reader.

6. The smart access control reader of claim 1, wherein the smart access control reader further comprises at least one of a camera, a touchpad, a light-emitting diode (LED) indicator, an imaging sensor, an audio sensor, a wireless controller, a touch controller, a display controller, a network controller, an external interface bus configured to connect to an external authentication device, a second interface configured to communicate with a user device to regulate access based on a payment, and a power management integrated circuit (PMIC), wherein the PMIC performs power management for one or more components of the smart access control reader.

7. The smart access control reader of claim 1, wherein the processor is further configured to:
   detect a tampering event associated with the smart access control reader; and
   generate an alert.

8. The smart access control reader of claim 7, wherein the processor is further configured to protect data stored in the smart access control reader by at least one of deleting and encrypting the data, in response to the detecting of the tampering event.

9. The smart access control reader of claim 7, wherein the processor is further configured to capture at least one of an image, a video recording, and an audio recording, in response to the detecting of the tampering event.

10. The smart access control reader of claim 1, wherein the processor is further configured to translate the first credential before transmitting the second credential to the access control panel of the access control system.

11. The smart access control reader of claim 1, wherein the second credential is stored in the storage module during a setup procedure.

12. The smart access control reader of claim 1, wherein the first credential is a user credential and the second credential is an access control panel credential.

13. The smart access control reader of claim 1, wherein the processor is further configured to determine the identity of a user associated with the first credential based on the first credential.

14. The smart access control reader of claim 1, wherein the smart access control reader further comprises an interface configured to receive an updated first credential from a user device.

15. The smart access control reader of claim 1, wherein the storage module is further configured to store a list of authorized credentials, and wherein the determining whether the one or more first credentials are authorized comprises comparing the first credential to credentials in the list of authorized credentials.

16. A method for controlling access to a physical space comprising:
   receiving, by an interface of a smart access control reader, one or more first credentials;

determining, via the smart access control reader, whether the one or more first credentials are authorized; and transmitting, via the smart access control reader, a second credential stored in a storage module of the smart access control reader to an access control panel of the access control system when the one or more first credentials are authorized, in response to a request by a first user to access an area monitored by the access control system.

17. The method of claim 16, further comprising determining, by the smart access control reader, whether the one or more first credentials are authorized by:

comparing the one or more first credentials against a list of authorized credentials stored in a database; and validating the one or more first credentials based on the comparison.

18. The method of claim 16, further comprising:

detecting a tampering event associated with the smart access control reader; and generating an alert in response to the detecting the tampering event.

19. The method of claim 18, further comprising capturing, with the smart access control reader, at least one of an image, a video recording, and an audio recording, in response to the detecting of the tampering event.

20. The method of claim 16, further comprising storing a list of authorized credentials, and wherein the determining whether the one or more first credentials are authorized comprises comparing the first credential to credentials in the list of authorized credentials.

21. A method for providing access to an area monitored by an access control system comprising:

replacing a first access control reader connected to the access control system with a smart access control reader, wherein the first access control reader is configured to provide access to the area based on a plurality of first credentials associated with the first access control reader;

providing, by the smart access control reader, to at least one first user access to the area based on at least one credential of the plurality of first credentials in response to a request by the at least one first user to access the area;

receiving from a server, by the smart access control reader, a second credential; and providing, by the smart access control reader, to a second user access to the area based on the received second credential in response to a request by the second user to access the area.

22. A smart access control system for an access point comprising:

a wireless interface of a smart control reader at the access point configured to receive at least one first credential from a user mobile device;

a remote database configured to store a plurality of credentials associated with a pre-existing access control reader previously located at the access point and a plurality of credentials associated with the smart access control reader; and a processor of the smart control reader configured to receive the at least one first credential from the wireless interface and provide a user of the user mobile device with access to the access point based on the plurality of credentials associated with the pre- existing access control reader previously located at the access point and the plurality of credentials associated with the smart access control reader.

23. A smart access control reader for an access point, the smart access control reader comprising:

a wireless interface configured to receive one or more first credentials from a user mobile device; and a processor operatively connected to the wireless interface, wherein the processor is configured to:

receive, from the wireless interface, the one or more credentials from the user mobile device, receive information from a remote database, and determine whether the one or more first credentials is authorized, and provide the user with access to the access point based on the one or more credentials from the user.

* * * * *